US012679576B2

(12) United States Patent　　　　(10) Patent No.: US 12,679,576 B2
Oja et al.　　　　　　　　　　　　　(45) Date of Patent:　　Jul. 14, 2026

(54) ATTACHABLE DELIVERY DEVICES AND METHODS FOR ATTACHING THE ATTACHABLE DELIVERY DEVICE TO A TARGET

(71) Applicant: Northrop Grumman Systems Corporation, Falls Church, VA (US)

(72) Inventors: Kyle Oja, South Ogden, UT (US); Duane J. Garbe, Mendon, UT (US); Justin Christensen, Tremonton, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 18/932,365

(22) Filed: Oct. 30, 2024

(65) Prior Publication Data

US 2026/0116590 A1　　Apr. 30, 2026

(51) Int. Cl.
B64U 60/30　　　(2023.01)
*B64U 10/14*　　　(2023.01)
*B64U 101/18*　　(2023.01)

(52) U.S. Cl.
CPC ..............　B64U 60/30 (2023.01); *B64U 10/14* (2023.01); *B64U 2101/18* (2023.01)

(58) Field of Classification Search
CPC .... B64U 60/30; B64U 2101/18; B64U 10/14; B64U 30/29; B64U 10/13; B64U 50/19; B64U 20/87; B64U 2101/30; B05B 14/30; B05B 1/28; B05D 5/005; B05D 1/02; B05D 3/0254; B05D 3/0493; B05D 3/067; B64D 1/18
See application file for complete search history.

(56) References Cited

U.S. PATENT DOCUMENTS

| | | | |
|---|---|---|---|
| 9,016,185 B1 * | 4/2015 | Lambertus | B63G 7/08 89/1.13 |
| 9,187,161 B2 * | 11/2015 | Lambertus | B63G 7/08 |
| 9,561,842 B1 * | 2/2017 | Camacho-Cardoza | G05D 1/0206 |
| 9,753,461 B1 * | 9/2017 | Johnson | G05D 1/0011 |
| 10,155,587 B1 * | 12/2018 | Tang | G05D 1/0094 |
| 11,834,163 B2 * | 12/2023 | Patterson | B64C 27/33 |
| 2013/0125741 A1 * | 5/2013 | Lambertus | B63G 7/02 89/1.13 |

(Continued)

FOREIGN PATENT DOCUMENTS

| | | | | |
|---|---|---|---|---|
| EP | 3931087 A1 * | 1/2022 | | G08G 5/55 |
| WO | WO-2020173680 A1 * | 9/2020 | | B64U 80/86 |

*Primary Examiner* — Benjamin P Lee

(74) *Attorney, Agent, or Firm* — Dority & Manning, P.A.

(57) ABSTRACT

An attachable delivery device is configured to be carried by a delivery vehicle and to deploy a payload at a target. The attachable delivery device includes a base configured to house the payload. The attachable delivery device also includes at least one tape spring attached to the base. The at least one tape spring is configured to deploy from a first transport position to a second deployed position. The attachable delivery device also includes a buckle contact configured to attach to the base and to move relative to the base. The movement of the buckle contact relative to the base is configured to cause the at least one tape spring to deploy from the first transport position to the second deployed position.

21 Claims, 10 Drawing Sheets

(56) References Cited

U.S. PATENT DOCUMENTS

| | | | | | |
|---|---|---|---|---|---|
| 2016/0075418 | A1* | 3/2016 | Lambertus | ............... | B63G 7/08 |
| | | | | | 89/1.13 |
| 2017/0276284 | A1* | 9/2017 | Finodeyev | .......... | G01M 3/2815 |
| 2018/0150087 | A1* | 5/2018 | Enos | ........................ | H04L 67/12 |
| 2018/0178896 | A1* | 6/2018 | Lee | ......................... | B64C 11/28 |
| 2020/0148360 | A1* | 5/2020 | Zhang | ...................... | B64D 1/22 |
| 2021/0007327 | A1* | 1/2021 | Weyer | .................... | G16H 40/63 |
| 2021/0071996 | A1* | 3/2021 | Bijou | ....................... | B64D 1/02 |
| 2021/0354812 | A1* | 11/2021 | Patterson | ............. | B64U 30/293 |
| 2022/0274705 | A1* | 9/2022 | Sly | ........................... | B64D 1/04 |
| 2023/0356862 | A1* | 11/2023 | Zhang | .................. | B64U 20/60 |
| 2025/0180332 | A1* | 6/2025 | Lacaze | .................. | B64U 50/13 |
| 2025/0187760 | A1* | 6/2025 | Tao | ........................ | B64U 30/20 |

\* cited by examiner

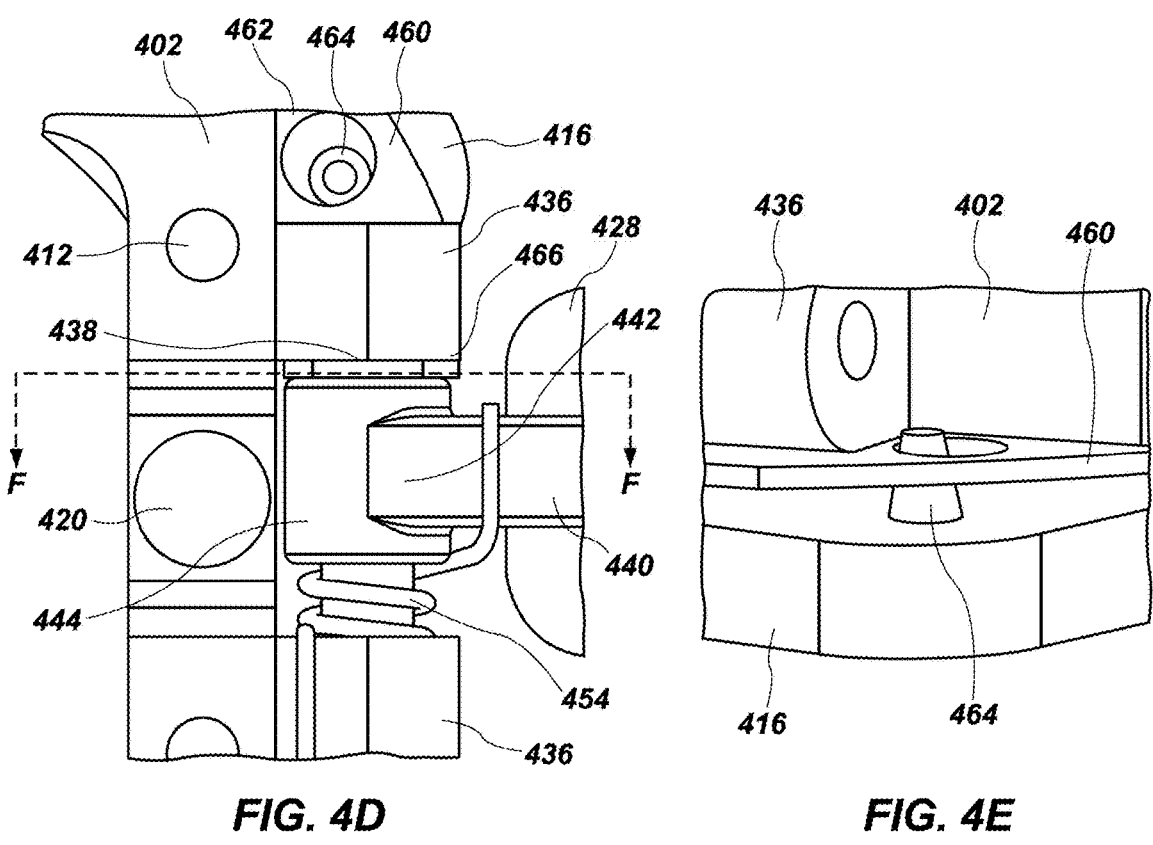
FIG. 4D                    FIG. 4E
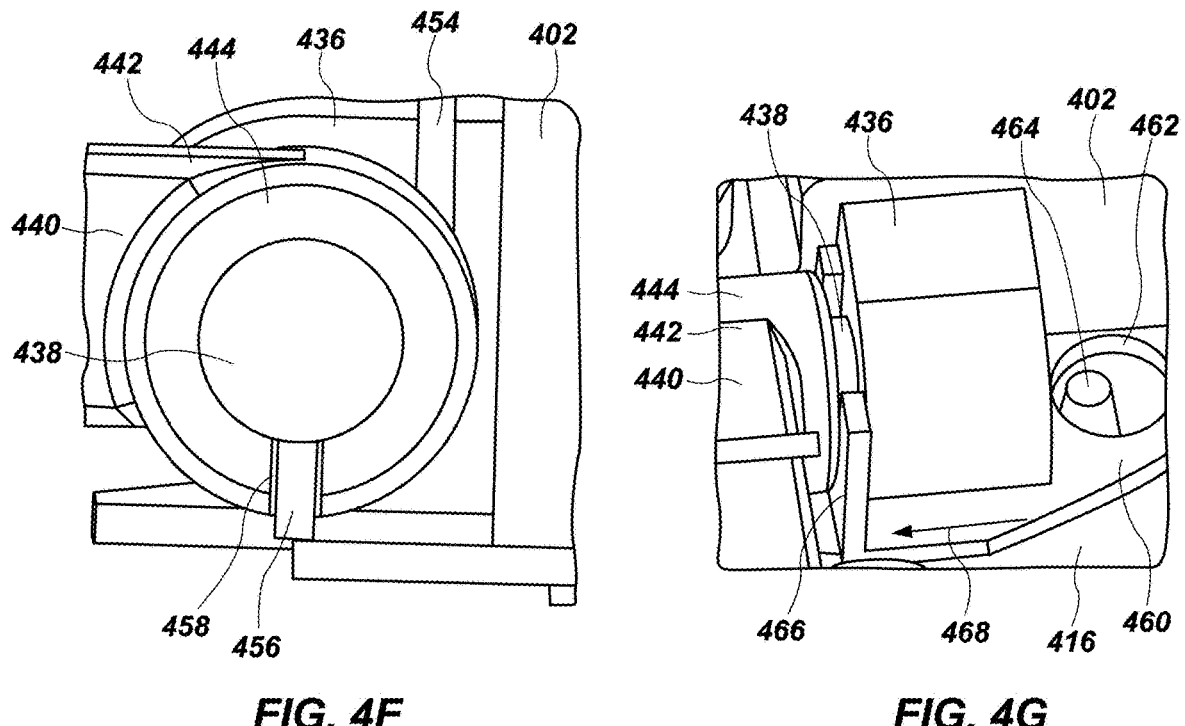
FIG. 4F                    FIG. 4G

ATTACHABLE DELIVERY DEVICES AND METHODS FOR ATTACHING THE ATTACHABLE DELIVERY DEVICE TO A TARGET

TECHNICAL FIELD

This disclosure relates generally to remote delivery devices and, more specifically, to remote delivery devices that are transportable by a delivery vehicle to deliver a payload to a target.

BACKGROUND

There are many applications for unmanned aerial vehicles ("UAVs"). Such applications range from the piloting of UAVs by hobbyists to the use of UAVs during military operations. For example, small UAVs may provide capabilities for surveillance, reconnaissance, and precision attacks. In some applications, one or more small UAVs may be used to conduct precise, isolated, or coordinated attacks on one or more targets. During such operations, the UAV may deliver a payload to a target such as delivering an explosive device to neutralize the target.

One drawback of using a small UAV to deliver a payload is that the small UAV is expended during the operation. That is, the small UAV is effectively a single use UAV because the UAV is only able to deliver a single payload during its lifespan. This may lead to increased costs because for each payload to be delivered, a separate small UAV is provided.

BRIEF SUMMARY

In one aspect, an attachable delivery device is configured to be transported by a delivery vehicle and to deliver a payload at a target. The attachable delivery device includes a base configured to house the payload. The attachable delivery device also includes at least one tape spring attached to the base. The at least one tape spring is configured to deploy from a first transport position to a second deployed position. The attachable delivery device also includes a buckle contact configured to attach to the base and to move relative to the base. The movement of the buckle contact relative to the base is configured to cause the at least one tape spring to deploy from the first transport position to the second deployed position.

In one aspect, an attachable delivery device is configured to be transported by a delivery vehicle and to deploy a payload at a target. The attachable delivery device includes a base configured to house the payload and at least one tape spring attached to the base. The at least one tape spring is configured to deploy from a first transport position to a second deployed position based on contact between the attachable delivery device and a surface of the target to attach the attachable delivery device to the target.

In one aspect, a method of attaching an attachable delivery device to a target is provided. The method includes transporting the attachable delivery device to a surface of the target. The attachable delivery device includes one or more tape springs in a first transport position. In response to contact of the attachable delivery device with the surface of the target, the method further includes deploying the one or more tape springs from the first transport position to a second deployed position such that the one or more tape springs wrap around a portion of target.

BRIEF DESCRIPTION OF THE DRAWINGS

For a detailed understanding of the disclosure, reference should be made to the following detailed description, taken in conjunction with the accompanying drawings, in which like elements have generally been designated with like numerals.

FIG. 4D illustrates an enlarged top view of the attachable delivery device shown in FIG. 4A, FIG. 4E shows an enlarged perspective view of the attachable delivery device shown in FIG. 4A, FIG. 4F shows an enlarged section view taken along the line F-F in FIG. 4D, FIG. 4G shows an enlarged perspective view of the attachable delivery device shown in FIG. 4A.

DETAILED DESCRIPTION

Figure 1:
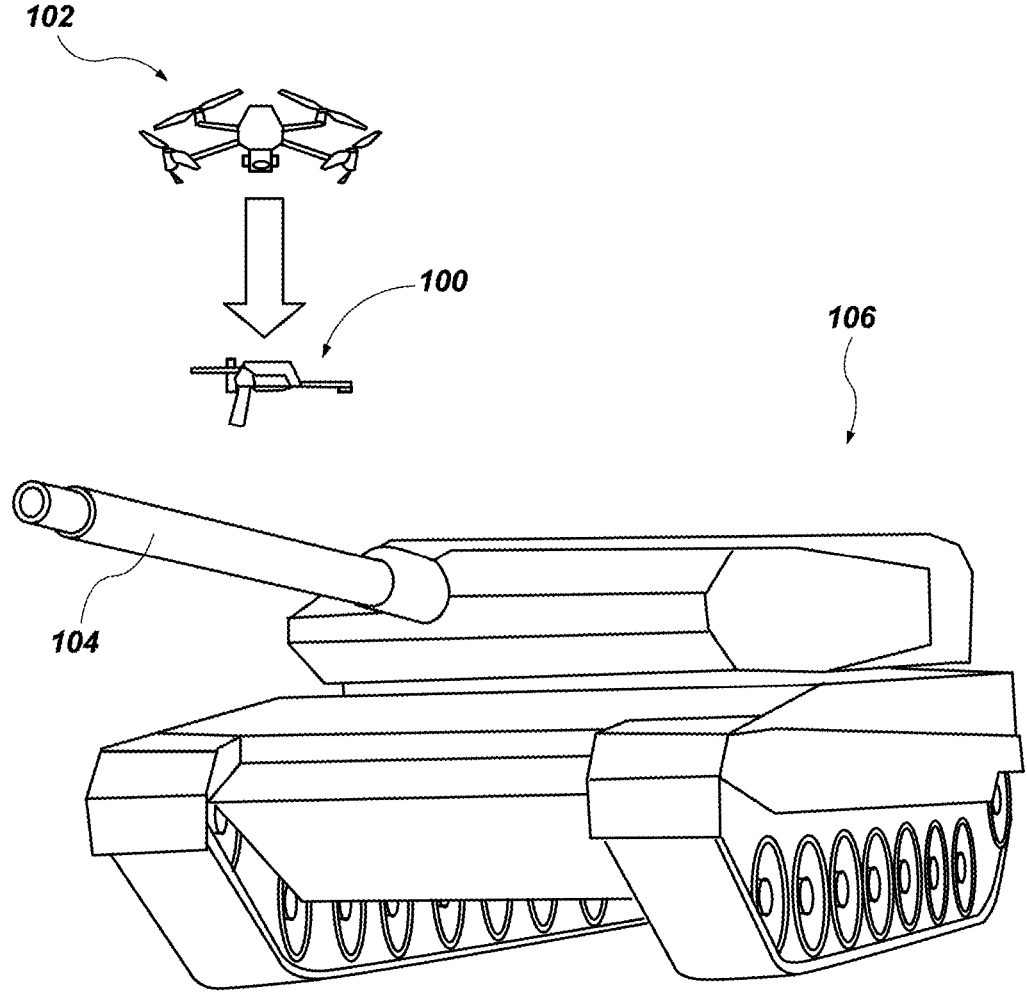
FIG. 1 illustrates an exemplary attachable delivery device being deployed to a target in accordance with embodiments of the disclosure.

The illustrations presented herein are not actual views of any attachable delivery device, UAV, or any component thereof, but are merely idealized representations, which are employed to describe embodiments of the invention.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "top," "bottom," "upper," "lower," "above," "beneath," "side," "upward," "downward," etc., is used for clarity and convenience in understanding the disclosure and accompanying drawings, and does not connote or depend on any specific preference or order, except where the context clearly indicates otherwise. For example, these terms may refer to an orientation of elements of any attachable delivery device or UAV when utilized in a conventional manner. Furthermore, these terms may refer to an orientation of elements of any attachable delivery device or UAV as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

FIG. 1 illustrates an exemplary attachable delivery device being deployed to a target in accordance with some embodiments. The attachable delivery device is used with a delivery vehicle to deliver a payload to the target while the delivery vehicle can be retrieved for reuse. The attachable delivery device 100 is configured to be transported by a delivery vehicle 102, such as a UAV or drone. The delivery vehicle 102 may be a small UAV such as a quad-rotor UAV. However, other UAVs may also be used in connection with the attachable delivery device 100. Additionally, the attachable delivery device 100 may be utilized with other delivery vehicles such as with unmanned ground vehicles ("UGVs"), unmanned surface vehicles ("USVs"), or the like. Furthermore, the attachable delivery device may be used in connection with other forms of transportation such as being hand carried, being transported at the end of a pole, being attached to the end of a robotic arm, etc.

The attachable delivery device 100 is configured to be transported (e.g., propelled, carried) by the delivery vehicle 102 to a target 104. The target 104 may be a tank 106, such as a barrel of the tank 106. However, the attachable delivery device 100 according to embodiments of the disclosure may be used against other targets, such as pressurized cylinders, artillery barrels, vehicle engines, vehicle hoods, infrastructure, or munition casings. The attachable delivery device 100 may be configured to be released from the delivery vehicle 102 at a distance from the target 104, or the delivery vehicle 102 may transport the attachable delivery device 100 directly to the target 104 prior to releasing the attachable delivery device 100. Once the delivery vehicle 102 releases the attachable delivery device 100, the delivery vehicle 102 may return to a location from which it was deployed, allowing the delivery vehicle 102 to be reused.

The attachable delivery device 100 may attach to the target 104 to deploy a payload, such as a munition configured to neutralize the target 104. However, this is not intended to be limiting as the attachable delivery device 100 may be used to deliver a variety of payloads to various types of targets. The attachable delivery device 100 may be delivered to other targets 104, such as non-military targets. The attachable delivery device 100 may, for instance, be configured for attachment to beams, poles, or branches. The attachable delivery device 100 may also be used in non-military applications, such as in surveillance, construction, environmental, oil and gas, or energy applications. For example, the attachable delivery device 100 may be configured to deliver camera equipment or sensors to remote locations such as on trees or other objects.

FIG. 2A-2D show an attachable delivery device 200 according to embodiments of the disclosure. The attachable delivery device 200 may be similar to the attachable delivery device 100 and may be configured to be transported by the attachable delivery device 100 shown in FIG. 1. In some embodiments, the attachable delivery device 200 comprises a base 202. The base 202 comprises a housing 204 with a payload compartment 206 configured to contain a payload (not shown). The payload compartment 206 is shown as a relatively rectangular depression formed in a surface of the housing 204 in FIGS. 2A-2D. However, the payload compartment 206 may be configured (e.g., shaped and sized) to contain the payload depending on a desired payload to be housed in the payload compartment 206.

The base 202 may be formed as shown in a relatively rectangular shape. However, the base 202 may take on a variety of other shapes such as circular, triangular, hexagonal, etc. The base 202 may be formed of and include a strong, lightweight material to facilitate transport via a delivery vehicle (e.g., delivery vehicle 102). For example, the base 202 may be formed from one or more of aluminum, titanium, steel, or alloys thereof. The base 202 may further be formed from a plastic material. The base 202 may be fabricated via any suitable manufacturing process such as one or more of casting, molding, additive manufacturing, machining, or the like.

The base 202 is configured to support one or more tape springs 228. The tape springs 228 are configured to attach to a target (e.g., target 104 shown in FIG. 1). In this example, four tape springs 228 are provided that each extend along a side surface of the base 202. However, any number of tape springs 228 may be used, and thus the number of tape springs 228 may be more or less than four. The number of tape springs 228 may be selected depending on dimensions and materials of the target. For example, a single tape spring 228 may be used that extends in two opposing directions from the base 202. In some embodiments, three tape springs 228 may be used that extend in directions about 120 degrees from one another. Other numbers and orientations of tape springs 228 may be used depending on the selected target or other factors.

Each tape spring 228 may be attached to the base 202 via a pivot clamp 208. The pivot clamp 208 may extend from a side surface of the base 202 and may attach to the tape spring 228 at a position between a proximal end and a midpoint of the tape spring 228. A proximal end touch point 210 may also extend from the base 202 and may contact an upper surface of the tape spring 228 at or adjacent to a proximal end of the tape spring 228. The proximal end touch point 210 may be a body that protrusion that is attached to the base 202 or that is formed to protrude from the base 202 to contact the upper surface of the tape spring 228 to provide stability to the tape spring 228.

The base 202 may further comprise one or more mounting holes 212 and one or more through holes 214. The mounting holes 212 and the through holes 214 may be formed, for example, by drilling into the base 202. The mounting holes 212 may be disposed about a periphery of the base 202 and may facilitate the mounting of the payload within the payload compartment 206. In some embodiments, the mounting holes 212 may also facilitate the mounting and release of the attachable delivery device 200 to and from the delivery vehicle (e.g., delivery vehicle 102). The through hole 214 may also facilitate the mounting of the payload within the payload compartment 206. The through hole 214 may further provide a line-of-sight to the target (e.g., target 104) for the payload contained within the payload compartment 206. In some examples where the payload is an explosive device, the through hole 214 may also be configured to direct energy from the initiated explosive device in a direction extending underneath the housing 204 and toward the target (e.g., target 104). The through hole 214 may be formed at any suitable diameter, which may be larger or smaller than that shown in FIGS. 2A-2D.

The attachable delivery device 200 further includes a buckle contact 216. The buckle contact 216 may be attached to a bottom side of the base 202 and may be configured to move relative to the base 202. The base 202 may comprise one or more through holes 218 (shown in FIG. 2D). Fasteners 220 may extend through the through holes 218 and thread into threaded apertures 222 in the buckle contact 216. The interface between the through hole 218 and the fastener 220 may allow relative movement between the through hole 218 and the fastener 220. With the fastener 220 being threaded into the threaded apertures 222, the movement of the fastener 220 relative to the through hole 218 facilitates relative movement between the base 202 and the buckle contact 216. While the fastener 220 is shown to be fixedly attached to the buckle contact 216 and to slidably interface with the base 202, the fastener 220 may also be fixedly attached to the base 202 while slidably interfacing with the buckle contact 216.

In some embodiments, the buckle contact 216 may be biased away from the base 202. For example, the attachable delivery device 200 may comprise linear springs (not shown) disposed around the fasteners 220 that bias the buckle contact 216 away from the base 202.

The buckle contact 216 may include one or more raised buckle points 224 that are configured to interface with a bottom side of the tape springs 228. Each raised buckle points 224 may comprise a body that protrudes from an upper surface of the buckle contact 216. The raised buckle points 224 may be formed integrally with the buckle contact 216 or may be attached thereto, such as via a threaded aperture. In some embodiments, the buckle contact 216 comprises four raised buckle points 224 that each interface with one of the four tape springs 228. The raised buckle points 224 may be positioned such that each raised buckle point 224 interfaces with a respective tape spring 228 at a position between a respective pivot clamp 208 and proximal to the end touch point 210. The raised buckle points 224 are configured to actuate the tape springs 228 from a first transport position to a second deployed position as explained in more detail below.

The buckle contact 216 may comprise a hollow portion 226. The hollow portion 226 may decrease an overall weight of the buckle contact 216, and therefore the attachable delivery device 200. The hollow portion 226 may also allow space for the payload, or may provide a line-of-sight and/or a path for energy from the payload, such as an explosive device, to be directed through the hollow portion 226 of the buckle contact 216 to a target (e.g., such as target 104 in FIG. 1).

The buckle contact 216 may be formed from any suitable material that provides sufficient strength and that is relatively lightweight for transport. Such materials may include metallic materials including aluminum, titanium, steel, or alloys thereof. The buckle contact 216 may also be formed from a plastic material. The buckle contact 216 may be fabricated via any suitable manufacturing process such as one or more of casting, molding, additive manufacturing, machining, etc.

The tape springs 228 may comprise one or more attachment holes 230. The attachment holes 230 are configured to facilitate the mounting of the tape springs 228 to the pivot clamps 208 of the base 202 so that the tape springs 228 may rotate relative to the base 202 via the pivot clamps 208. Of course, the tape springs 228 may be attached to the pivot clamps 208 via other attachment mechanisms such as via adhesives, welding, clamps, etc. An optional attachment structure 232 may be mounted at or adjacent to a distal end of each of the tape springs 228 via a distal mounting aperture 234. The attachment structure 232 may be configured to attach the distal end of the tape spring 228 to a target (e.g., the target 104). The attachment structure 232 may, for example, be a magnet or a hook. However, the attachment structure 232 may be any number of attachment structures to help attach the distal end of the tape spring 228 to a target, such as an adhesive strip, a friction enhancing surface, or the like. The attachment structure 232 may be mounted at or adjacent to the distal end of each tape spring 228 via any suitable attachment mechanism such as fasteners, adhesives, welds, etc.

In some examples, the attachment structure 232 may comprise an extension of the tape spring 228. For example, the attachment structure 232 may attach to an additional tape spring, such as tape springs 228, to increase an overall length of the tape springs 228 to allow for attachment to relatively larger targets and/or to provide a larger holding surface area when the tape springs 228 are deployed.

Figure 2A:
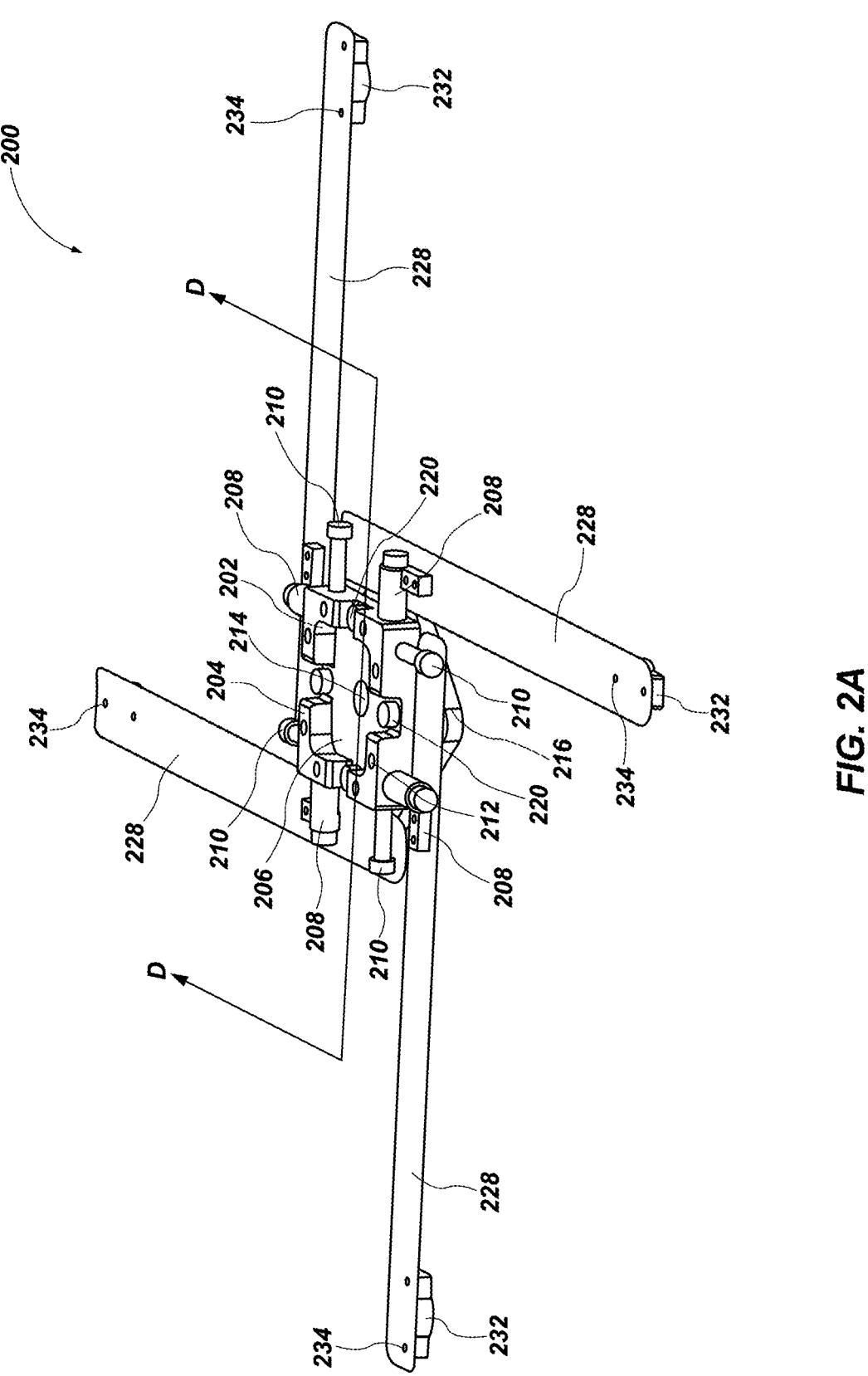
FIG. 2A illustrates a top perspective view of an exemplary attachable delivery device in accordance with embodiments of the disclosure.
Figure 2B:
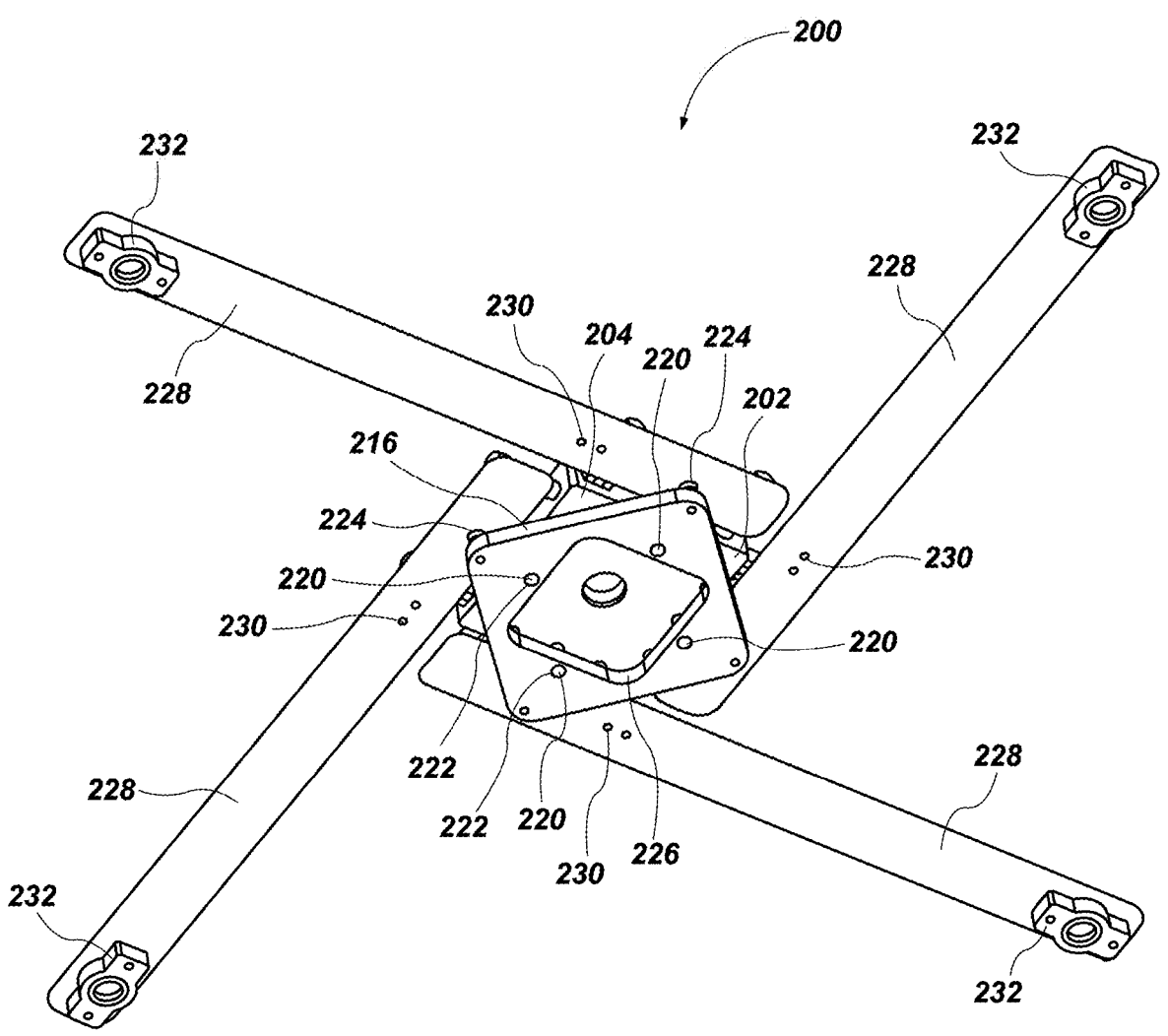
FIG. 2B illustrates a bottom perspective view of the attachable delivery device shown in FIG. 2A.
Figure 2C:
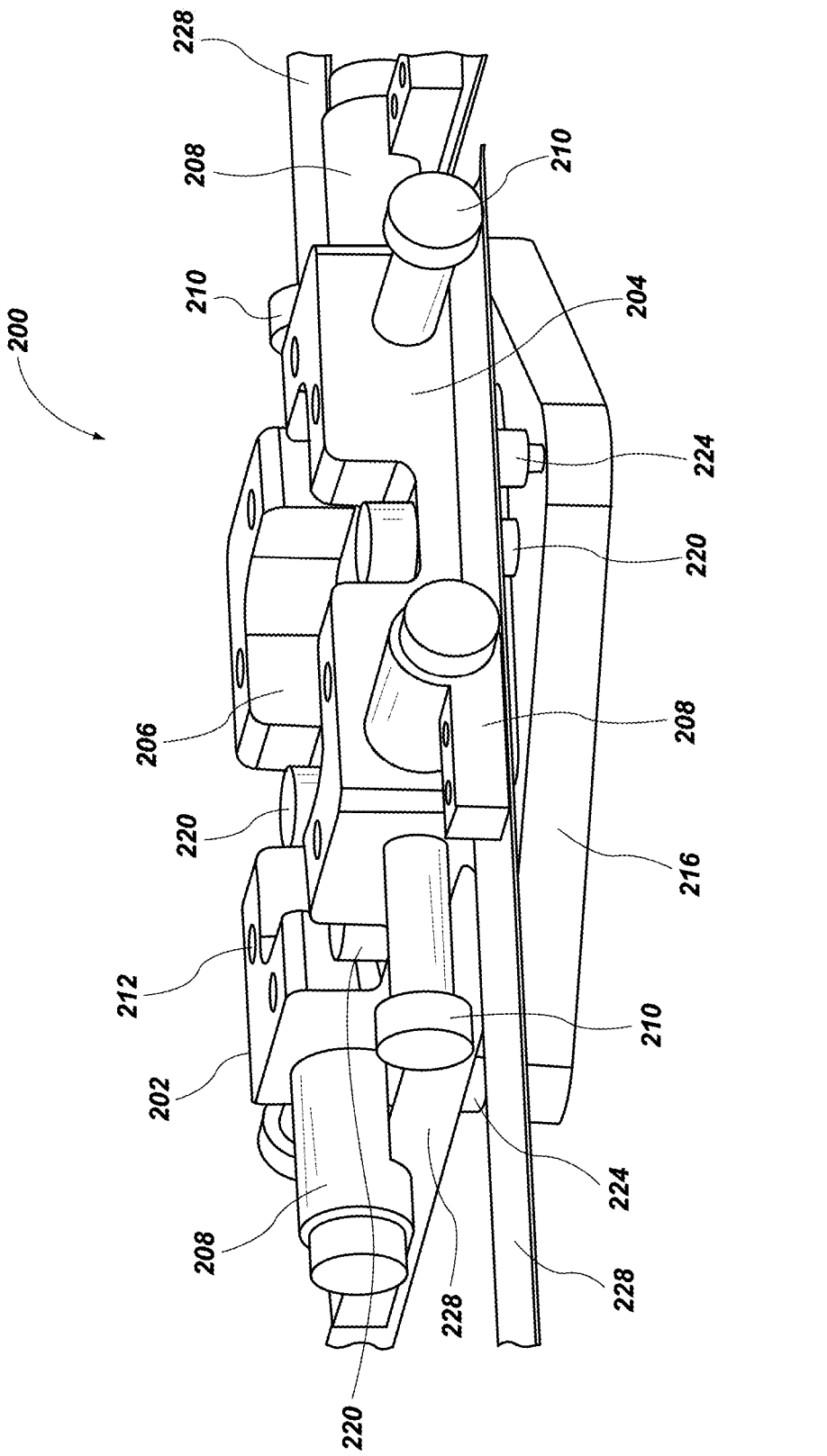
FIG. 2C illustrates an enlarged perspective view of the attachable delivery device shown in FIG. 2A.
Figure 2D:
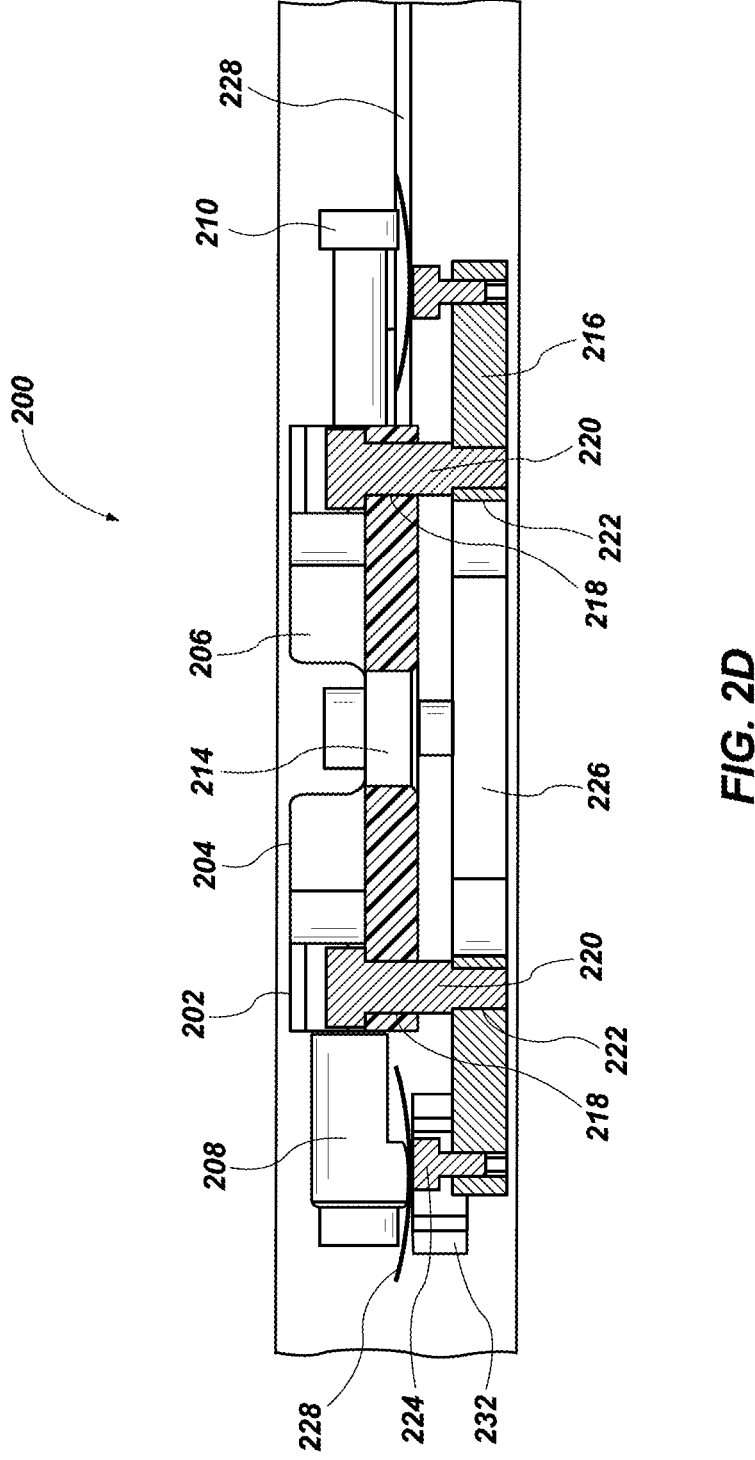
FIG. 2D illustrates a section view of the attachable delivery device taken along the line D-D in FIG. 2A.

While FIGS. 2A and 2B show a single attachment structure 232, any number of attachment structures 232 may be positioned along a length of the tape springs 228. The attachment structure 232 may provide retention force when the attachable delivery device 200 contacts the target. By way of example only, silicone or an adhesive may be formed on at least a portion of the bottom surfaces of the tape spring 228. The presence of the attachment structure 232 may depend on the dimensions of the tape springs 228, the dimensions of the target, and a desired degree of attachment between the tape springs 228 and the target. The configuration of the tape springs 228 and the attachment structures 232, when present, may allow attachment to dirty surfaces of the target.

Since the components of the attachable delivery device 200 are formed of lightweight and readily available materials, the attachable delivery device 200 may be disposable.

The tape springs 228 are configured as a bistable mechanism similar to a carpenter's tape. Each tape spring 228 is formed as a flexible straight strip with a curved, thin-walled profile in cross-section. The tape springs 228 maintain a substantially straight (e.g., extended) configuration until the cross-sectional curvature is sufficiently deformed by an outside force at a point along its length such that the tape springs 228 deploy into a coiled position. The coiled position of the tape springs 228 enables the attachment of the attachable delivery device 200 to the target. The tape springs 228 may be comprised of any suitable material that is sufficiently lightweight and has sufficient strength. Such materials may include aluminum, steel, titanium, or alloys thereof. Other materials such as polymer based materials may also be used. The tape springs 228 may be fabricated using suitable manufacturing methods such as extrusion, stamping, additive manufacturing, machining, or the like.

The bistable properties of the tape springs 228 of the attachable delivery device 200 may be utilized to deploy the tape springs 228 from the first transport position where the tape springs 228 maintain a substantially straight configuration to the second deployed position where the tape springs 228 are biased into a coiled position. Movement of the buckle contact 216 relative to the base 202 may bring the raised buckle points 224 into contact with a bottom side of the tape springs 228 between the pivot clamp 208 and the proximal end touch point 210. This relative movement may be caused by the interaction between the buckle contact 216 and a surface of the target to which the attachable delivery device 200 has been transported. The relative movement between the buckle contact 216 and the base 202 cause the raised buckle points 224 to deform the curved cross-section of the tape springs 228 to the point that the tape springs 228 transition from the first transport position to the second deployed position.

For example, the raised buckle points 224 interface with a lower surface of the tape springs 228 between the pivot clamp 208 and the proximal end touch point 210. With the pivot clamp 208 and the proximal end touch point 210 supporting the tape spring, the movement of the raised buckle points 224 cause the tape spring 228 to begin to deform. Once the tape spring 228 is sufficiently deformed, the tape spring transitions from its first stable configuration in the first transport position (e.g., a substantially straight and extended position) to its second stable configuration in the second deployed position (e.g., a coiled position). The pivot clamps 208 may accommodate the rotational movement of the tape springs 228 as they transition to the second deployed position.

As the tape springs 228 transition to the second deployed position, the tape springs 228 may attach to (e.g., wrap around) at least a portion of the target (e.g., the target 104). The attachment structures 232 at the distal ends of the tape springs 228 (and/or at other positions along the tape springs 228) may help to attach the tape springs 228 in position around the target. The tape springs 228 in the second deployed position along with the attachment structure 232 of the tape springs 228 may securely mount the attachable delivery device 200 to the target (e.g., the target 104). With the attachable delivery device 200 securely mounted to the target, the attachable delivery device 200 may deliver the payload mounted within the payload compartment 206 of the base 202 of the attachable delivery device 200. If, for example, the payload is an explosive device, the explosive device may become securely attached to the target following the deployment of the tape springs 228. The explosive device may be remotely initiated after the delivery vehicle 102 is released, damaging or destroying the target. The explosive device may also be automatically initiated after a predetermined amount of time after the delivery vehicle 102 is released.

The attachable delivery device 200 may become attached to the target in a short amount of time, such as on the order of seconds. The degree of attachment to the target may also be sufficient to hold the payload on the target while the delivery vehicle flies away.

Figures 3A, 3B, 3C:
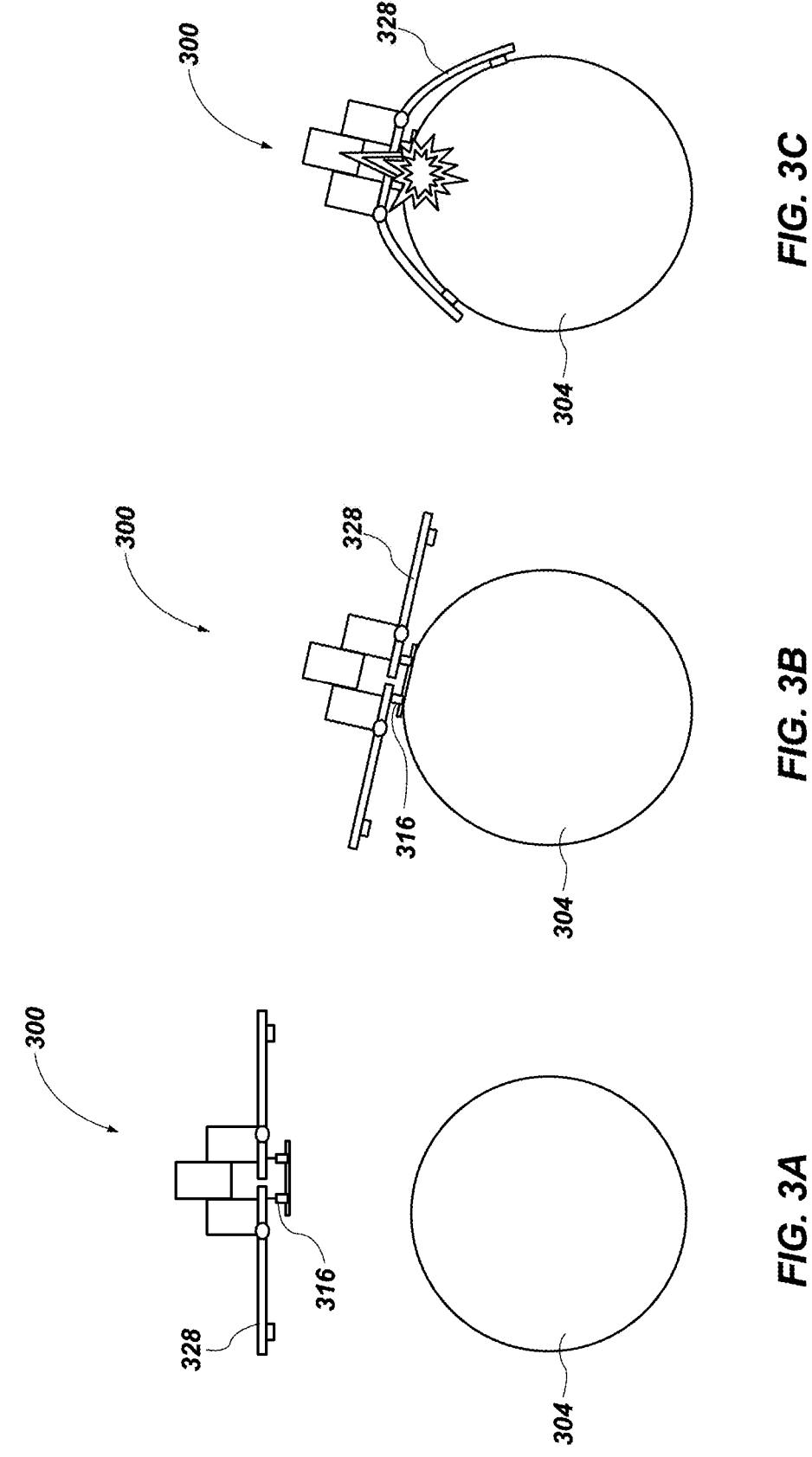
FIGS. 3A-3C illustrate a method of deploying an attachable delivery device in accordance with embodiments of the disclosure.
Figure 4A:
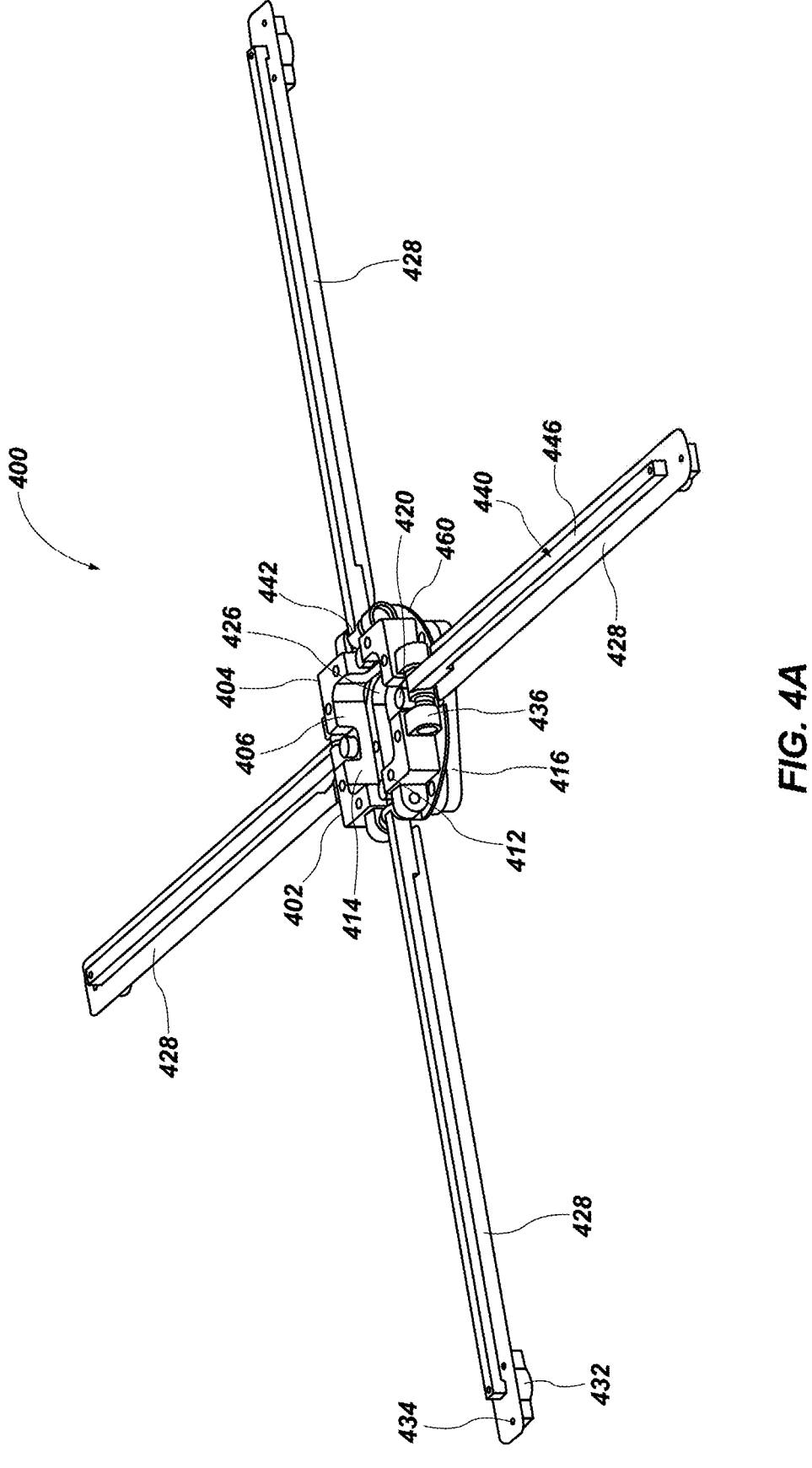
FIG. 4A illustrates a top perspective view of an exemplary attachable delivery device in accordance with embodiments of the disclosure.
Figure 4B:
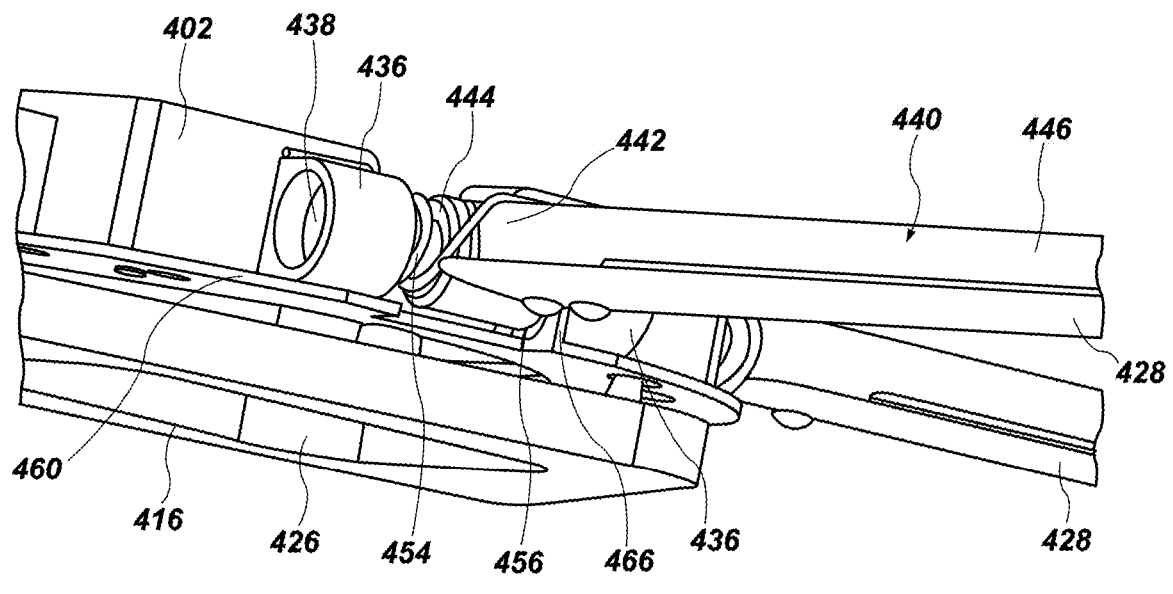
FIG. 4B illustrates an enlarged, side, bottom, perspective view of the attachable delivery device shown in FIG. 4A.
Figure 4C:
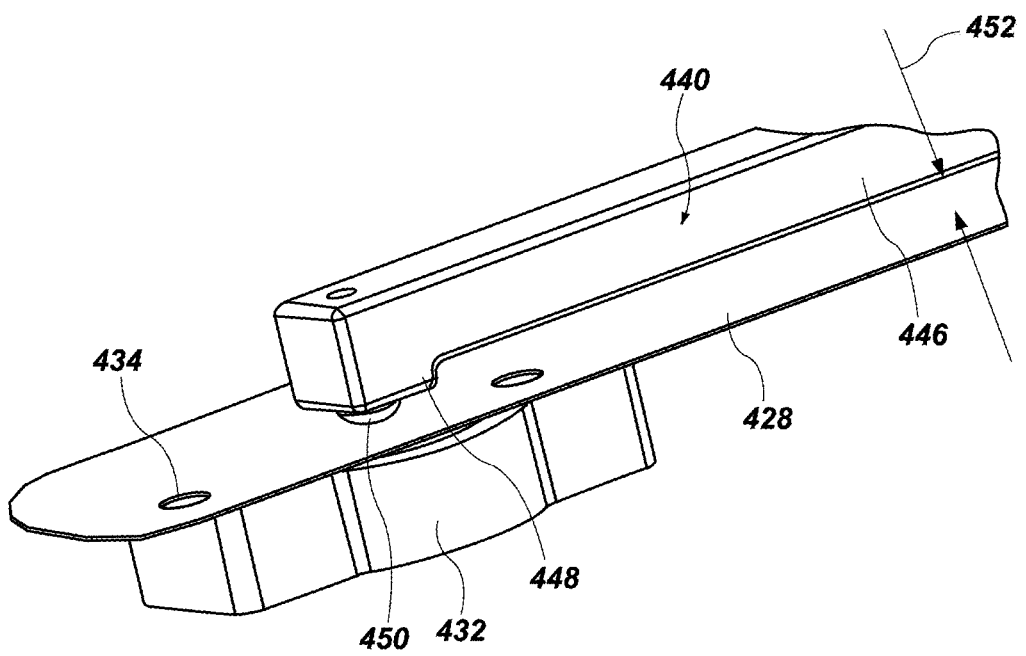
FIG. 4C illustrates an enlarged perspective view of the attachable delivery device shown in FIG. 4A.
Figure 4H:
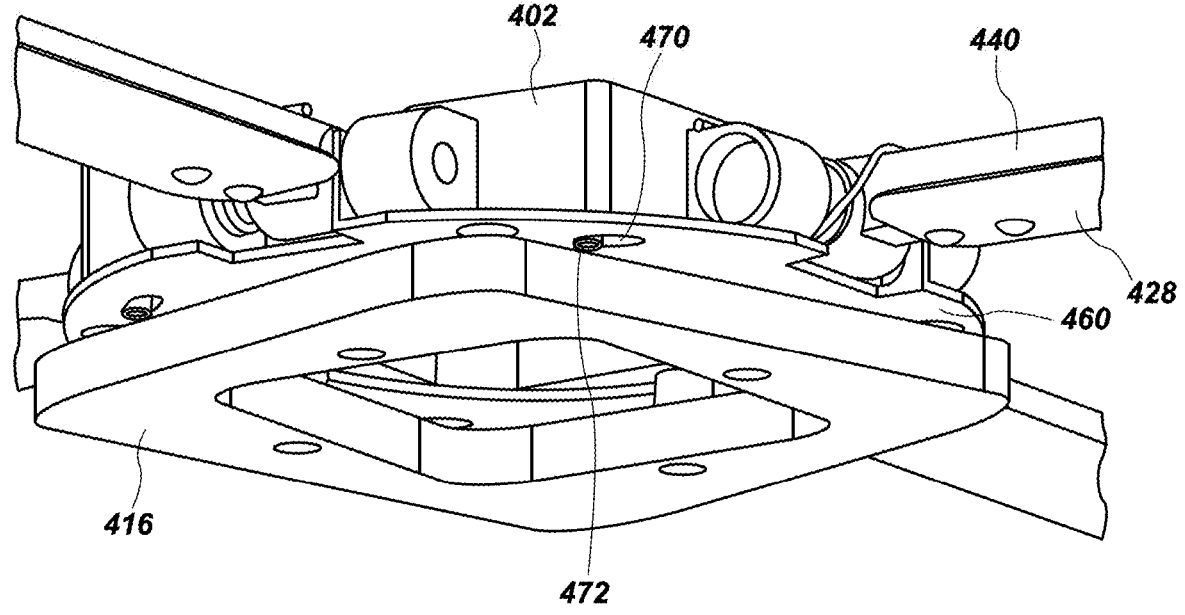
FIG. 4H shows an enlarged, bottom, perspective view of the attachable delivery device shown in FIG. 4A.

FIGS. 3A-3C illustrate a method of deploying an attachable delivery device in accordance with embodiments of the disclosure. In FIGS. 3A-3C, an attachable delivery device 300 may be similar to the attachable delivery device 200 and the attachable delivery device 100 described above. As shown in FIG. 3A, the attachable delivery device 300 may be transported to a target 304. For example, the attachable delivery device 300 may be transported by an unmanned aerial vehicle or drone (e.g., delivery vehicle 102 shown in FIG. 1).

In FIG. 3A, the attachable delivery device 300 is transported to and oriented toward the target 304 such that a buckle contact 316 (e.g., similar to buckle contact 216 shown in FIGS. 2A-2D) comes into contact with an outer surface of the target 304. The surface of the target 304 to which the attachable delivery device 300 is to be attached may be convex. While FIG. 3A shows a cylindrical shaped target 304, the target 304 may be another shape. The attachable delivery device 300 may be oriented by the delivery vehicle for attachment to a desired portion of the target 304. For instance, the delivery vehicle may enable the attachable delivery device 300 to be positioned at susceptible portions of the target. The tape springs 328 (e.g., tape springs 228) may be configured in the first transport position. In some embodiments, the attachable delivery device 300 may be configured to be released (e.g., dropped) from the delivery vehicle at a distance from the target 304 such that the buckle contact 316 comes into contact with the outer surface of the target 304. By way of example only, the attachable delivery device 300 may be released at a distance of less than about 10 feet from the target, such as less than about 5 feet from the target or less than about 3 feet from the target. In some embodiments, the attachable delivery device 300 is transported by the delivery vehicle such that the buckle contact 316 comes into contact with the outer surface of the target 304 prior to being separated from the delivery vehicle, as shown in FIG. 3B. For simplicity, the delivery vehicle is not shown in FIGS. 3A and 3B.

As shown in FIG. 3C, once the attachable delivery device 300 is placed onto the outer surface of the target 304, the tape springs 328 may be configured to move from the first transport position to the second deployed position. When the buckle contact 316 contacts the outer surface of the target 304, the weight of the attachable delivery device 300 and/or the momentum of the attachable delivery device 300 causes the buckle contact 316 to move relative to the base of the attachable delivery device 300 (e.g., the buckle contact 216 moves relative to the base 202 via the interface between the fasteners 220 and the through holes 218). This relative movement brings the raised buckle points (e.g., raised buckle points 224) into contact with the tape springs 328 such that the raised buckle points sufficiently deform the tape springs 328 to cause the tape springs to deploy from the first transport position to the second deployed position.

The deployment of the tape springs 328 causes one or more of the tape springs 328 to wrap around at least a portion of the target 304. The attachment structures (e.g., attachment structures 232) on the tape springs 328 may further secure the attachable delivery device 300 to the target 304. Once the attachable delivery device 300 is secured to the target 304, the attachable delivery device 300 may be released from the delivery vehicle, and the delivery vehicle may leave the attachable delivery device 300 to return to an operator or place of deployment. Alternatively, the attachable delivery device 300 may be released from the delivery vehicle before attaching to the target 304. Meanwhile, the attachable delivery device 300 may deliver a payload to the target 304. For example, if the target 304 is a barrel of a tank (e.g., tank 106), the attachable delivery device 300 may deliver an explosive device that is subsequently detonated on the target 304, destroying or otherwise incapacitating the target 304. However, other payloads may be carried by the attachable delivery device 300, and the target 304 may be any number of other items. For example, the payload may be a camera, which is mounted to the attachable delivery device 300, and the attachable delivery device 300 may be deployed to attach to a tree branch.

Other embodiments of an attachable delivery device are also possible. For example, FIGS. 4A-4H show an example of an attachable delivery device 400. To avoid repetition, not all features (e.g., structures, features, devices) shown in FIGS. 4A-4H are described in detail herein. Rather, unless described otherwise below, in FIG. 4A-4H, a feature designated by a reference numeral that is a 200 increment of the reference numeral of a feature previously described with reference to FIGS. 2A-2D will be understood to be substantially similar to the previously described feature. By way of non-limiting example, unless described otherwise below, features designated by the reference numerals 406 and 420 in FIGS. 4A-4H respectively will be understood to be substantially similar to the payload compartment 206 and the fastener 220 previously described herein with reference to FIGS. 2A-2D.

The attachable delivery device 400 may comprise mounting protrusions 436 extending from the base 402. The mounting protrusions 436 may be configured to receive an axle 438 that is attached to a support 440. In some embodiments, the support 440 comprises a pivoting proximal end 442 that is configured to pivot about the axle 438. The pivoting proximal end 442 may comprise a hub 444 that is attached to and surrounds the axle 438 and that is configured to rotate relative to the axle 438. The tape spring 428 may be configured to be mounted at or adjacent to the pivoting proximal end 442 of the support 440, such as via fasteners. In this manner, the tape springs 428 are configured to rotate relative to the base 402 along with the supports 440.

The support 440 may be configured to provide strength to the tape springs 428 while the attachable delivery device 400 is in the first transport position (e.g., with the tape springs 428 in the straight position). This may help prevent the tape springs 428 from buckling or deploying during transportation of the attachable delivery device 400. The support 440 may comprise a support arm 446 that extends along a length of the tape spring 428. While the support arm 446 may extend almost an entire length of the tape spring 428 as shown, the support arm 446 could also extend partially along the tape spring 428. The support 440 may comprise a distal protrusion 448 formed at a distal end of the support arm 446. The distal protrusion 448 may facilitate a clearance 452 between the support arm 446 and the tape spring 428 to allow space for the deployment of the tape spring 428. When the distal attachment 432 comprises a magnet, the distal protrusion 448 may be configured to be magnetically attracted to the magnet. For example, the support 440 may be made from a magnetically attractable material. In another example, the support 440 may comprise a magnetically attractable material attached to a distal protrusion 448 such as a distal screw 450. The magnetic attraction between the distal protrusion 448 or the distal screw 450 and the distal attachment 432 is sufficient to allow the distal protrusion 448 to remain in contact with the tape spring 428 while allowing separation between the distal protrusion 448 and the tape spring 428 upon deployment of the tape spring 428.

In FIGS. 4A-4H, the attachable delivery device 400 may be configured to deploy from the first transport position to the second deployed position by deploying the tape springs tape spring 428 via torsion springs 454. Upon deployment, the torsion springs 454 are configured to rotate the tape springs 428 relative to the axles 438 with sufficient speed such that the impact between the tape springs 428 and the target (e.g., target 104, 304) causes the tape spring to deform sufficiently to deploy into the coiled position.

The torsion spring 454 may be connected at one end to the support 440 and at the other end to the mounting protrusions 436. The torsion spring 454 may be biased to rotate the support 440, and therefore the tape spring 428, away from a plane perpendicular to the base 402. The torsion spring 454 may further be configured to provide a linear bias to the support 440 to bias the pivoting proximal end 442 of the support 440 towards one of the mounting protrusions 436. One of the mounting protrusions 436 associated with each support 440 may comprise a locking tab 456. The locking tab 456 is configured to lock the hub 444 of the pivoting proximal end 442 to maintain the attachable delivery device 400 in the first transport position with the tape springs 428 in the straight position.

For example, the hub 444 may comprise a keyed opening 458 which comes into alignment with the locking tab 456 when the support 440 and the tape spring 428 are in the straight position (e.g., when the attachable delivery device 400 is in the first transport position). When the keyed opening 458 and the locking tab 456 are in alignment, the torsion spring 454 may bias the hub 444 such that the locking tab 456 engages the keyed opening 458 to lock the support 440 and tape spring 428 in the straight position.

Similar to the attachable delivery device 200, the attachable delivery device 400 comprises a buckle contact 416 that is configured to cause the attachable delivery device 400 to deploy from the first transport position to the second deployed position when the attachable delivery device 400 is placed onto the target (e.g., target 104, 304). The attachable delivery device 400 may comprise a release plate 460 that is configured to interface with the buckle contact 416. The release plate 460 is mounted to the base 402 and is configured to be rotatable relative to the base 402. For example, the release plate 460 may comprise guide holes 470 that receive base interfaces 472 to secure the release plate 460 to the base 402 while facilitating movement of the base interfaces 472 within the guide holes 470.

The release plate 460 comprises interface holes 462 that are configured to interface with conical protrusion 464 of the buckle contact 416. When the attachable delivery device 400 is placed on a surface of a target, the buckle contact 416 moves closer to the base 402. This movement causes the conical protrusion 464 to move relative to the interface holes 462. The conical surface of the conical protrusion 464 acts as a cam surface and an inside surface of the interface holes 462 acts as a cam follower. When the conical protrusion 464 moves toward the base 402, the interface between the conical protrusion 464 and the interface holes 462 causes the release plate 460 to rotate relative to the base 402 and the buckle contact 416 in a direction shown by arrow 468 in FIG. 4G. The release plate 460 comprises u-shaped flanges 466 that interface with sides of respective hubs 444. The rotational movement of the release plate 460 causes the u-shaped flanges 466 to move the hubs 444 such that the keyed opening 458 of each hub 444 moves out of engagement with the locking tab 456 corresponding to each hub 444. This, allows the torsion springs 454 to rotate the supports 440 and tape springs 428, causing the tape springs 428 to impact the target (e.g., target 104, 304). The force of the impact causes the tape springs 428 to transition from the first straight position to the second coiled position, thereby deploying the attachable delivery device 400 from the first transport position to the second deployed position.

In addition to allowing the delivery vehicle to be reused, the attachable delivery device according to embodiments of the disclosure may be relatively low cost compared to expensive, conventional targeting systems using targeting software. The attachable delivery device according to embodiments of the disclosure may also exhibit larger errors (e.g., wider ranges) in attaching to the target compared to conventional targeting systems, which have strict targeting requirements. Further, the attachable delivery device may also facilitate alignment of the payload with the target based on the deployment of the tape springs wrapping around at least a portion of the target. Since the attachable delivery device according to embodiments of the disclosure uses tape springs and attachment structures, no additional power is used by the attachable delivery device.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. An attachable delivery device configured to be transported by a delivery vehicle to deliver a payload at a target, the attachable delivery device comprising:

a base configured to house the payload;

at least one tape spring attached to the base, the at least one tape spring configured to deploy from a first transport position to a second deployed position; and a buckle contact configured to attach to the base and to move relative to the base, the movement of the buckle contact relative to the base being configured to cause the buckle contact to interface with a surface of the at least one tape spring to deploy the at least one tape spring from the first transport position to the second deployed position.

2. The attachable delivery device of claim 1, further comprising a pivot clamp configured to rotatably attach the at least one tape spring to the base.

3. The attachable delivery device of claim 2, wherein the pivot clamp is attached to the at least one tape spring between a midpoint and a proximal end of the at least one tape spring.

4. The attachable delivery device of claim 3, wherein the base comprises a touch point that contacts the at least one tape spring at or adjacent to the proximal end of the at least one tape spring.

5. The attachable delivery device of claim 4, wherein the buckle contact comprises a raised buckle point that is configured to interface with the at least one tape spring to cause the at least one tape spring to deploy from the first transport position to the second deployed position.

6. The attachable delivery device of claim 5, wherein the raised buckle point is positioned to interface with the at least one tape spring between the pivot clamp and the touch point.

7. The attachable delivery device of claim 1, further comprising one or more attachment structures disposed on or adjacent to the at least one tape spring, the one or more attachment structures configured to secure the at least one tape spring to the target.

8. The attachable delivery device of claim 1, further comprising at least one fastener connecting the base and the buckle contact, the at least one fastener fixedly attached to one of the base or the buckle contact and slidably interfacing with the other of the base or the buckle contact.

9. The attachable delivery device of claim 1, wherein the base comprises a payload compartment configured to house a payload.

10. The attachable delivery device of claim 1, wherein the base comprises mounting apertures configured to facilitate attachment to the delivery vehicle.

11. The attachable delivery device of claim 1, further comprising a support rotatably mounted to the base, the at least one tape spring being mounted to the support.

12. The attachable delivery device of claim 11, further comprising a torsion spring interfacing between the base and the support, the torsion spring configured to rotate the support and the at least one tape spring relative to the base.

13. The attachable delivery device of claim 12, wherein the base comprises a locking tab configured to rotationally lock the support relative to the base, and wherein the movement of the buckle contact relative to the base disengages the locking tab from the support.

14. An attachable delivery device configured to be transported by a delivery vehicle to deploy a payload at a target, the attachable delivery device comprising:

a base configured to house the payload; and tape springs attached to the base, a first tape spring of the tape springs extending in a first direction relative to the base, a second tape spring of the tape springs extending in a second direction relative to the base, the second direction being non-parallel to the first direction, and the tape springs being configured to deploy from a first transport position to a second deployed position;

a buckle contact supported by the base and configured to interface with the tape springs to deploy the tape springs from the first transport position to the second deployed position, wherein the buckle contact comprises raised buckle points that interface with the tape springs to deform the tape springs to deploy the tape springs from the first transport position to the second deployed position based on contact between the attachable delivery device and a surface of the target to attach the attachable delivery device to the target.

15. The attachable delivery device of claim 14, further comprising a distal attachment disposed on or adjacent to a distal end of each of the tape springs.

16. The attachable delivery device of claim 15, wherein the distal attachment comprises one or more of a magnet, an adhesive, or a friction enhancing surface.

17. The attachable delivery device of claim 14, further comprising pivot clamps configured to rotatably mount the tape springs to the base.

18. The attachable delivery device of claim 14, wherein the base comprises a payload compartment to support the payload.

19. The attachable delivery device of claim 18, wherein the base comprises a through hole within the payload compartment.

20. A method of attaching an attachable delivery device to a target, the method comprising:

transporting the attachable delivery device to a surface of the target by a delivery vehicle, the attachable delivery device comprising one or more tape springs, a base, and a buckle contact, wherein the one or more tape springs are attached to the base in a first transport position, and wherein the buckle contact is configured to attach to the base and to move relative to the base;

releasing the attachable delivery device from the delivery vehicle; and in response to contact of the attachable delivery device with the surface of the target, the movement of the buckle contact relative to the base being configured to cause the buckle contact to interface with a surface of the one or more tape springs to deploy the one or more tape springs from the first transport position to a second deployed position such that the one or more tape springs rotate relative to the base of the attachable delivery device and wrap around at least a portion of the target.

21. The method of claim 20, further comprising securing the one or more tape springs to the surface of the target with a distal attachment disposed on or adjacent to a distal end of the one or more tape springs, the distal attachment being one or more of a magnet, an adhesive, or a friction enhancing surface.

* * * * *